United States Patent [19]

Alvesalo

[11] Patent Number: 5,384,824
[45] Date of Patent: Jan. 24, 1995

[54] METHOD FOR CARRYING OUT A LOCATION UPDATING FROM A MOBILE CELLULAR RADIOPHONE SYSTEM TO ANOTHER CELLULAR RADIOPHONE SYSTEM

[75] Inventor: Antero Alvesalo, Helsinki, Finland

[73] Assignee: Nokia Telecommunications Oy, Espoo, Finland

[21] Appl. No.: 983,528

[22] PCT Filed: Jul. 1, 1992

[86] PCT No.: PCT/FI92/00205
§ 371 Date: Apr. 22, 1993
§ 102(e) Date: Apr. 22, 1993

[87] PCT Pub. No.: WO93/01689
PCT Pub. Date: Jan. 21, 1993

[30] Foreign Application Priority Data

Jul. 2, 1991 [FI] Finland .................................. 913217

[51] Int. Cl.⁶ ......................... H04M 11/00; H04Q 7/00
[52] U.S. Cl. .......................................... 379/59; 379/58; 455/33.1
[58] Field of Search .............................. 379/59, 60, 63; 455/33.1, 33.2, 56.2, 56.1

[56] References Cited

U.S. PATENT DOCUMENTS 4,399,330  8/1983  Kuenzel .
5,095,529  3/1992  Comroe et al. ...................... 379/60
5,212,822  5/1993  Fukumine et al. .................. 379/60

FOREIGN PATENT DOCUMENTS 0167458  1/1986  European Pat. Off. .

OTHER PUBLICATIONS

GSM Spec., pp. 1, 213, 230, 295–299, Jan. 1991.
DECT spec., pp. 1, 76, 77 and 130–136, May 17, 1991.

Primary Examiner—Curtis Kuntz
Assistant Examiner—I. Rana
Attorney, Agent, or Firm—Cushman Darby & Cushman

[57] ABSTRACT

A method for carrying out a location updating from a mobile cellular radiophone system, such as a DECT system, to another cellular radiophone system, such as the GSM mobile phone system. In order to enable trunking of an incoming call to a terminal of a mobile system and also to obtain such a method for carrying out the location updating as ensures, as well as possible, a compatible information content in the networks, the method includes the following steps: (a) when the location area of the other system changes, the change is signalled to the mobile system, (b) an instruction is transmitted from the mobile system via radio path to the terminal of the mobile system to initiate an internal update procedure of the mobile system, and the internal update procedure of the mobile system is carried out in which the terminal of the mobile system transmits to the mobile system an indication of its presence, which step (b) is carried out in respect of at least one terminal of the mobile system, (c) the internal update procedure of the other radiophone system is carried out by the mobile station of the other radiophone system in respect of the at least one terminal of the mobile system, and (d) the procedure is continued from step (b) in respect of the terminals of the mobile system not yet updated.

9 Claims, 1 Drawing Sheet

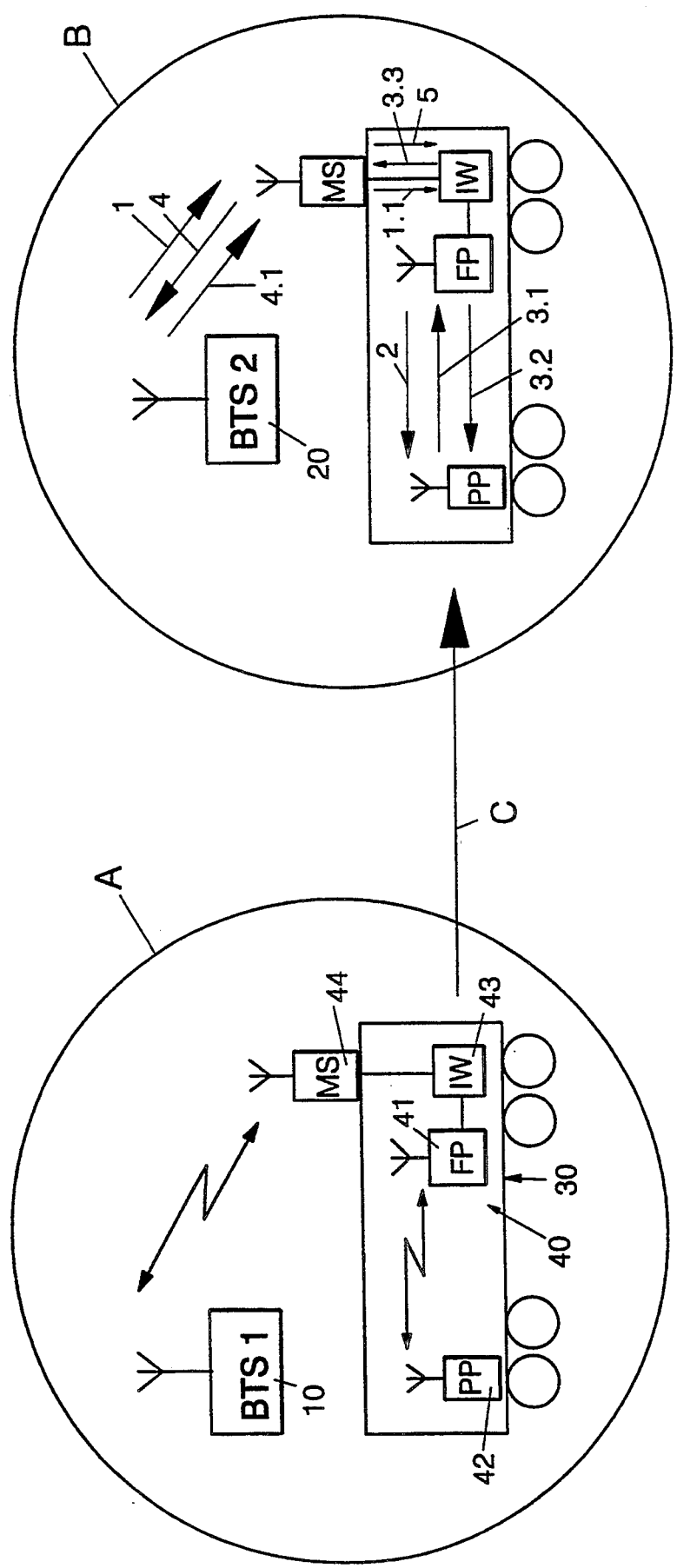

METHOD FOR CARRYING OUT A LOCATION UPDATING FROM A MOBILE CELLULAR RADIOPHONE SYSTEM TO ANOTHER CELLULAR RADIOPHONE SYSTEM

BACKGROUND OF THE INVENTION

The invention relates to a method for carrying out a location updating from a mobile cellular radiophone system, such as a DECT system, to another cellular radiophone system, such as the GSM mobile phone system, which mobile cellular radiophone system comprises at least one base station with at least one mobile terminal in its area, in which method the location area identity transmitted by the base stations of said other cellular radiophone system is observed at a mobile station of said other cellular radiophone system in order to determine when the mobile radiophone system moves from one location area to another in said other cellular network. The method according to the invention is intended to be used in particular when a DECT system located in a moving vehicle such as a train is connected with the GSM mobile phone system. The method according to the invention is however not limited to these particular systems but can be applied to connecting other similar networks as well.

The GSM (Groupe Special Mobile) is, as is well known, a pan-European mobile communication system. The GSM network is divided into national GSM networks, which have in their area one or more service areas, in each of which services are provided by one Mobile Services Switching Centre (MSC). A GSM service area for its part is divided into one or more Location Areas, each of them being an area covered by several cells. Each cell is serviced by one base station (BTS, Base Transceiver Station). More detailed information on the structure and functioning of the GSM system can be obtained e.g. from GSM specification 04.08, Ver. 3.11.0.

The DECT (Digital European Cordless Telecommunications) is a pan-European cordless phone system standard. Three typical environments where cordless phones are used are home, office and a so-called telepoint, which is a base station of the system. Base stations are located in public places for incoming or outgoing calls. A DECT terminal can be used to transmit not only speech but also data. More detailed information on the structure and functioning of the DECT system can be obtained e.g. from the specification DECT Common Interface, Part: Network Layer Ver. 8.00.

The holder of a DECT terminal may also be a client of a GSM network, in which case his terminal comprises the Subscriber Identity Module (SIM) of a GSM mobile phone or a corresponding functional block. The DECT system can also be located in a moving vehicle such as a train and be connected with a GSM mobile phone network by means of a radio path. In that case the basic problem is, however, that a call coming to the DECT terminal cannot be trunked to the destination, because in the DECT system the DECT location area does not change in the train although the GSM location area does as the train moves (location updating to the DECT system is effected in accordance with the specification on the basis of the DECT location area). The GSM system thus does not receive information on the presence of the DECT terminal and cannot, with respect to said DECT terminal, effect the location updating to the GSM network.

SUMMARY OF THE INVENTION

The primary object of the present invention is thus to obviate this disadvantage and to enable trunking of an incoming call to a terminal moving within another cellular radiophone system. Using a preferred embodiment of the method of the invention is the best way of ensuring, in all conditions, a compatible information content in these interconnected systems.

On the other hand, certain method embodiments of the present invention are the most advantageous in that using them is the best way of ensuring that the location updating is never effected on false grounds. This prevents e.g. the location updating from being effected to the same terminal of the mobile system simultaneously at two sites. Since the terminals of the mobile system effect the updating of the location area of another cellular radiophone network only when needed, these solutions also save radio capacity compared e.g. with the location updating effected by a regular time control.

BRIEF DESCRIPTION OF THE DRAWING

In the following the invention will be explained in more detail with reference to the example depicted in the attached drawing, in which:

The sole FIGURE schematically represents a train having the DECT system disposed therein and moving from one GSM mobile phone system location area to another.

DETAILED DESCRIPTION

The FIGURE illustrates two adjacent GSM mobile phone network location areas A and B. The location area A comprises a base station 10, and the location area B a base station 20. A train 30 is located first in the GSM location area A, and when travelling as indicated by arrow C, it moves to the location area B. A DECT system (FP, Fixed Part) 40 is disposed in the train and in this case comprises a DECT base station 41. The system may also comprise a central part (CCFP, Central Control Fixed Part) connecting a plurality of base stations with one another. In the area of the DECT base station 41 there is at least one (typically several) portable DECT terminals (PP, Portable Part) 42 (the terms given in parenthesis are designations for corresponding blocks as employed in the English-language specifications). The DECT base station 41 is coupled through a protocol converter (IW, Inter Working) 43 to a GSM network mobile station 44. The protocol converter serves as a converter rendering compatible the different protocols used by the GSM and DECT systems. A separate protocol converter is not indispensable: the DECT base station 41 and the GSM network mobile station 44 can also be provided with built-in common interfaces. Neither is a protocol converter needed if the systems have identical protocols.

The steps of the method according to the invention are the following. In the FIGURE, the steps are marked with arrows having corresponding reference numerals.

Step 1

As the train 30 moves from the location area A to the location area B, the mobile station 44 detects a change in the location area identity transmitted by the GSM network base stations 10 and 20 (the base station 10 transmits an identity which is different from that transmitted by the base station 20). Detection is based on information received from the BCCH broadcasting channel (Broadcast Control Channel). This means that the mobile station receives in the system information block 3 (System information type 3) according to section 9.1.31 of the above-mentioned GSM specification an international Location Area Identity (LAI), defined in section 10.5.1.3 of the above-mentioned specification.

Step 1.1

Upon detection of a change in the GSM location area the mobile station 44 transmits to the DECT system 40 an indication of the change by transmitting, e.g. BCD-coded, the international location area identity (LAI) of the new location area to the DECT base station 41.

Step 2

On account of step 1.1 the DECT base station 41 selects the first active terminal 42 in its area and transmits thereto via radio path a location update request according to section 13.4.3 of the above-mentioned DECT specification.

In the steps to follow, 3.1 and 3.2, the location update procedure (Location registration) according to section 13.4.1 of said DECT specification is carried out.

Step 3.1

The DECT terminal 42, selected in step 2, sends to the DECT base station a Locate Request message according to said specification. The message contains a Network Assigned Identity pertaining to the old location area A of the DECT terminal and corresponding to the GSM Temporary Mobile Subscriber Identity (TMSI) as defined in section 7.7.28 of the above-described GSM specification and/or the Portable Identity according to section 7.7.30, which is the same as the International Mobile Subscriber Identity (IMSI) of the GSM area, and an Extended Location Information element according to section 7.7.25 of the above-described specification, containing the international location area identity of the old location area A.

Step 3.2

The DECT base station 41 responds to the location update message with a Locate accept message according to section 6.3.6.17 of the above-identified specification, in the extended location information element whereof it has placed the international location area identity of the new location area B, received from the mobile station 44.

Step 3.3

The DECT base station 41 confirms to the mobile station 44 the success of steps 2-3.2 with respect to said DECT terminal by transmitting to the mobile station 44 the Portable Identity of said terminal and/or the above-mentioned Network Assigned Identity pertaining to the old location area, and possibly the international location area identity of the old location area A, which information it has received from the DECT terminal in step 3.1.

After this, steps 2-3.3 can be repeated when desired in respect of one or more other DECT terminals. If steps 2-3.3 are carried out in respect of more than one DECT terminal, this can be done by carrying out steps 2-3.3 first in respect of one terminal, thereafter in respect of another terminal, etc., or for example, by first carrying out steps 2-3.2 successively in respect of each terminal, and only thereafter step 3.3 in respect of all of the terminals. The primary embodiment is however one in which said steps are carried out only in respect of one DECT terminal, this being followed by step 4.

Step 4

The mobile station 44 initiates the Location update procedure of section 4.4.4.1 of the above-mentioned GSM specification in respect of the DECT terminal. This means that it places the international location area identity of the old location area A in the LAI information element of the Location Updating Request which it sends and which is as disclosed in section 9.2.13 of the above-described GSM specification, and the above-mentioned Portable Identity of said DECT terminal and/or the above-mentioned Network Assigned Identity in the Mobile Identity which is as disclosed in section 10.5.1.4 of the above-identified GSM specification, depending on what it has received from the DECT terminal. If what was received from the DECT terminal is an IMSI (International Mobile Subscriber Identity), it is transmitted further, and if what was received from the DECT terminal is a Network Assigned Identity, it is transmitted further as a GSM temporary mobile subscriber identity (TMSI).

Within the GSM network the new location information is stored in a known manner in a Visitor Location Register (VLR), which updates the location information in the Home Location Register (HLR) if the mobile station is not previously known thereto. When the home location register receives a new location indication, it requests the visitor location register in whose area the mobile station previously was to delete the information concerning the station in question.

Step 4.1

In consequence of step 4, the mobile station 44 receives from the GSM network a standard Locate accept message in which the international location area identity must be the same as the location area identity received in step 1.

If steps 2-3.3 were carried out in respect of more than one DECT terminal, the internal GSM update procedure (steps 4-4.1) will also be carried out in respect of all said terminals. In this case all the steps of the update procedures can be performed first as regards one terminal, thereafter as regards another terminal, etc., or first accomplish one step (e.g. step 4) as regards all terminals (one terminal at the time) and only thereafter the following step (4.1) as regards all terminals (one terminal at the time).

Step 5

The mobile station 44 informs the DECT system 40 of the success or failure of steps 4 and 4.1 in respect of all DECT terminals in question. If steps 23.3 and steps 4-4.1 were carried out for more than one DECT terminal, the information can be given either always before the update procedure of the following DECT terminal or only after all update procedures. If the updating was successful, steps 2-5 are repeated for one or more DECT terminals not yet updated (the most advantageous embodiment is the one in which steps 2-5 are carried out for one DECT terminal at the time.) If the updating of one or more DECT terminals failed, steps 2-4 are repeated with the parameters of the old location area A, so that the information at the terminal corresponds to successfully updated location information.

Steps 2–5 are repeated for all terminals 42 actively present in the DECT system (unless the location area changes again before this, in which case the procedure starts from the beginning). 'Active' refers to a terminal which has not accomplished the Detach procedure according to section 6.3.6.13 of the above-identified DECT specification, which informs the base station that the terminal is not ready to receive incoming calls, or which terminal is otherwise known not to be present.

The foregoing disclosed two preferred embodiments of the invention, of which the primary embodiment is thus the one in which all the steps (2–5) are carried out for only one DECT terminal at the time, after which the same steps are repeated for the following active DECT terminal. These two embodiments can be modified to form a third embodiment in such a manner that the internal DECT update procedure (steps 2-3.2 or 2-3.3) is performed before the GSM location area changes (steps 1-1.1). In practice this means that the presence of the DECT terminal 42 can be ensured e.g. between train stations already before the GSM location area changes. In this case an instruction to initiate the internal DECT update procedure is first transmitted from the DECT system via radio path to the DECT terminal, and the internal DECT update procedure is performed at least for one DECT terminal. As the location area of the GSM system changes, such change is signalled to the DECT system, whereby the internal GSM update procedure is carried out for the at least one terminal of the DECT system by means of the mobile station 44.

The two embodiments described above can also be combined in such a manner that for instance between train stations the procedure of the third embodiment is followed first, and when the GSM location area changes, the procedure will be carried on according to the first or second embodiment.

In principle, it is also possible that the internal DECT update procedure is not carried out at all, even though the new location area of the DECT terminals was updated to the GSM system. Yet even this embodiment renders possible incoming calls to the DECT system. In this embodiment, therefore, as the location area of the GSM system changes, such change is signalled to the DECT system, after which the internal GSM update procedure is carried out for at least one terminal of the DECT system by means of the mobile station 44.

It is possible as well to modify the basic embodiment in such a manner that when the GSM location area changes, the internal GSM update procedure is first performed at least for one DECT terminal by means of the mobile station 44, and only after this the presence of said one or more DECT terminals is checked by performing for them the internal DECT update procedure.

Although the invention was described above with reference to the example depicted in the attached FIGURE, it is clear that the invention is not limited thereto but can be modified in many ways within the inventive concept disclosed above and in the attached claims. Therefore, although the example illustrates the functioning of the method according to the invention in GSM and DECT systems, it is not limited to GSM and DECT networks but can be applied to two other similar, mutually identical or different, networks.

I claim:

1. A method for carrying out a location-updating procedure from a mobile cellular radiophone system that includes at least one base station effectively associated with at least one mobile terminal located in a same area of said mobile cellular radiophone system as said base station, to another cellular radiophone system that includes a plurality of base stations, each having a respective location area, at least one of which base stations of said other cellular radiophone system is effectively associated with a respective mobile station which is effectively collocated with a respective said base station of said mobile cellular radiophone system for travel therewith from location area to location area of said other cellular radiophone system, said method comprising:

(a) transmitting location area identity signals by said base stations of said other cellular radiophone system for reception by said mobile station of said other cellular radiophone system, for thereby determining change of location of said mobile radiophone system from one said location area to another said location area of said other cellular radiophone system;

(b) upon reception by said mobile station of signals, resulting from conducting step (a), indicative of change in location of said mobile radiophone system from one said location area to another said location area, sending signals signalling said change, by said mobile station of said other cellular radio system, to said mobile cellular radiophone system;

(c) transmitting via a radio path from said mobile cellular radiophone system, as a result of reception thereby of signals from said mobile station in step (b) to at least one said mobile terminal of said mobile cellular radiophone system for initiating a mobile cellular radiophone system internal update procedure;

(d) conducting said mobile cellular radiophone system internal update procedure, in which said one mobile terminal of said mobile cellular radiophone system transmits to said mobile cellular radiophone system for reception thereby, signals indicative of presence of said one mobile terminal; and (e) transmitting signals indicative of presence of said one mobile terminal as a result of conducting steps (d), by said mobile cellular radiophone system to said mobile station of said other cellular radiophone system and by said mobile station to the base station of said other cellular radiophone system corresponding to the location area into which said mobile cellular radiophone system has moved and sending a confirmation signal back to said mobile station by said corresponding base station, for thereby permitting calls made to said one mobile terminal via said other cellular radiophone system to be received by said one mobile terminal, despite change in location area of said mobile cellular radiophone system.

2. The method of claim 1, wherein:
said mobile cellular radiophone system includes a plurality of said mobile terminals, and further including initiating steps (d) and (e) for each said mobile terminal.

3. The method of claim 2, wherein:
step (d) is conducted successively for all the respective said mobile terminals, one at a time.

4. The method of claim 2, wherein:
after step (d) has been conducted for at least one said mobile terminal, and has been initiated but has not been completed as to others of said mobile terminals, said mobile cellular radiophone system is changed in location to yet another location area, and said method further includes suspending completion of conducting step (d) as to any of said mobile terminals as to which step (d) remains incomplete, and, thereafter, conducting steps (a)–(e) relative to said yet another location area.

5. The method of claim 1, wherein:
in conducting step (e), said confirmation signal is not received by said mobile station, and said method further includes repeating steps (c)–(e).

6. The method of claim 1, wherein:
said mobile cellular radiophone system is a DECT system and said other cellular radiophone system is a GSM mobile phone system.

7. A method for carrying out a location-updating procedure from a mobile cellular radiophone system that includes at least one base station effectively associated with at least one mobile terminal located in a same area of said mobile cellular radiophone system as said base station, to another cellular radiophone system that includes a plurality of base stations, each having a respective location area, at least one of which base stations of said other cellular radiophone system is effectively associated with a respective mobile station which is effectively collocated with a respective said base station of said mobile cellular radiophone system for travel therewith from location area to location area of said other cellular radiophone system, said method comprising:
   (a) transmitting via a radio path from said mobile cellular radiophone system, to at least one said mobile terminal of said mobile cellular radiophone system for initiating a mobile cellular radiophone system internal update procedure;
   (b) conducting said mobile cellular radiophone system internal update procedure, in which said one mobile terminal of said mobile cellular radiophone system transmits to said mobile cellular radiophone system for reception thereby, signals indicative of presence of said one mobile terminal;
   (c) transmitting location area identity signals by said base stations of said other cellular radiophone system for reception by said mobile station of said other cellular radiophone system, for thereby determining change of location of said mobile radiophone system from one said location area to another said location area of said other cellular radiophone system;
   (d) upon reception by said mobile station of signals, resulting from conducting step (c), indicative of change in location of said mobile radiophone system from one said location area to another location area, sending signals signalling said change, by said mobile station of said other cellular radio system, to said mobile cellular radiophone system; and
   (e) transmitting signals indicative of presence of said one mobile terminal as a result of conducting steps (d), by said mobile cellular radiophone system to said mobile station of said other cellular radiophone system and by said mobile station to the base station of said other cellular radiophone system corresponding to the location area into which said mobile cellular radiophone system has moved and sending a confirmation signal back to said mobile station by said corresponding base station, for thereby permitting calls made to said one mobile terminal via said other cellular radiophone system to be received by said one mobile terminal, despite change in location area of said mobile cellular radiophone system.

8. A method for carrying out a location-updating procedure from a mobile cellular radiophone system that includes at least one base station effectively associated with at least one mobile terminal located in a same area of said mobile cellular radiophone system as said base station, to another cellular radiophone system that includes a plurality of base stations, each having a respective location area, at least one of which base stations of said other cellular radiophone system is effectively associated with a respective mobile station which is effectively collocated with a respective said base station of said mobile cellular radiophone system for travel therewith from location area to location area of said other cellular radiophone system, said method comprising:
   (a) informing said mobile station that said mobile cellular radiophone system has moved from a first to a second said location areas;
   (b) said mobile station informing said base station of said mobile cellular radiophone system as to existence of said mobile cellular radiophone system in said second indication area;
   (c) said base station of said mobile cellular radiophone system selecting one said mobile terminal and sending an update request signal thereto;
   (d) said one mobile terminal sending a locate request signal to said base station of said mobile cellular radiophone system;
   (e) said base station of said mobile cellular radiophone system sending a locate accept signal to said one mobile terminal;
   (f) said base station of said mobile cellular radiophone system sending a signal to said mobile station reporting contents of said locate request signal to said mobile station;
   (g) said mobile station sending a signal to at least one base station of said other cellular radiophone system reporting contents of said locate request signal, for updating said other cellular radiophone system as to identity and location of said one mobile terminal;
   (h) said at least one base station of said other cellular radiophone system sends to said mobile station a signal for confirming identity and location of said one mobile terminal;
   (i) said mobile station reporting to said base station of said mobile cellular radiophone system as to whether identity and location of said one mobile terminal have been confirmed; and
   (j) in absence of confirmation, repeating steps (c)–(i).

9. The method of claim 8, wherein:
said mobile cellular radiophone system is a DECT system and said other cellular radiophone system is a GSM mobile phone system.

* * * * *